Patented Sept. 27, 1949

2,483,049

UNITED STATES PATENT OFFICE 2,483,049

HALOGENATION PROCESS

John C. Hillyer, Bartlesville, Okla., and Clark H. Ice, Richland, Wash., assignors to Phillips Petroleum Company, a corporation of Delaware No Drawing. Application July 8, 1947, Serial No. 759,696

7 Claims. (Cl. 260—654)

This invention relates to improved methods for the halogenation of diolefins. In one particular aspect it relates to improved methods of halogenating conjugated diolefins wherein advantageous yields of vicinal dibromides are obtained. In another particular aspect it relates to solvents for effecting vicinal disposition of bromine atoms added to conjugated diolefins.

It has long been known that when a conjugated diolefin is subjected to halogenation the reaction may produce a mixture of isomeric dihalides, a tetrahalide or both, depending upon conditions, the ratio of reactants and the like. Farmer and his co-workers, J. Chem. Soc., 131 p. 729 (1928), have shown that butadiene unites with bromine to form a mixture of two dibromides. One of these is liquid and is the vicinal 1,2-dibromide. The other is a solid compound and was long ago proved by Thiele to be 1,4-dibromo-2-butene. By maintaining a relatively high ratio of diolefin to halogen or a low halogenation rate, Farmer obtained a product consisting substantially entirely of mixed isomeric dibromides. He reports substantial solvent effect upon the ratio of vicinal dibromide to 1,4-dibromide formed. With acetic acid as solvent, he obtained 70.3 per cent of 1,4-dibromide in the dibromides formed; with carbon disulfide 65.9 per cent of 1,4-product; with chloroform 63.0 per cent of 1,4 addition product; and with n-hexane 38.4 per cent of 1,4-dibromide.

Muscat and his co-workers, J. A. C. S., 52, 4043 (1930), show the chlorination of butadiene in solution in carbon disulfide, in ligroin and in chloroform. Mixtures of the two dichlorides and two tetrachlorides were obtained. In chlorination reactions a considerable excess of 1,2-dichloride over the 1,4-dichloride is usually formed. In carrying out such reactions the conjugated diolefin is maintained in large excess in the reaction mixture. The temperature has been controlled from —60° C. up to the boiling point of the conjugated diolefin.

Heretofore in bromination reactions the 1,4-dibromo product has generally been the predominant constituent with lesser amounts of the vicinal dibromide formed. However the vicinal dihalide has numerous potential uses as an intermediate in the production of useful organic chemicals and is therefore often the more valuable of the isomers. Thus methods for enhancing the yield of vicinal dihalide from the halogenation of diolefins are significant contributions to the art.

It is an object of this invention to provide a method for halogenating conjugated diolefins having from 4 to 10 carbon atoms wherein advantageous yields of vicinal dihalides are obtained. Another object is to provide an improved solvent for liquid phase bromination of conjugated diolefins having from 4 to 10 carbon atoms per molecule which effects a formation of vicinal dibromides in major proportions. Other objects and advantages will become apparent to those skilled in the art from the following detailed description.

We have now discovered a process for the bromination of conjugated diolefins whereby the product comprises a major proportion of the vicinal dihalide. According to the method of our invention the halogenation is effected in a solution of a conjugated diolefin in methylcyclopentane in which the ratio of solvent (methylcyclopentane) to solute (diolefin) is not less than 1:1. However, we prefer to operate with a solvent to diolefin ratio of from 2:1 to 4:1 as the solvent effect in formation of vicinal dihalides is not quite so great in more concentrated solutions. Larger ratios of solvent to diolefin may be used if desired but are less convenient in operation. The operation can be conducted in a relatively broad temperature range with efficient yields and substantially no loss of product in the formation of tetrahalogenated derivatives. Our process is applicable to bromination of conjugated diolefins having from 4 to 10 carbon atoms per molecule. Increased yields of the vicinal dihalide are obtained. Bromine is preferably supplied to the reaction in the liquid state.

The rate of introduction will depend on the ratio of unreacted diolefin to halogen in the reaction mixture and should be controlled so as to avoid the presence of any considerable excess of unreacted halogen. In general the mol ratio of diolefin to halogen in the reaction mixture should be between 4:1 and 1:1 although ratios outside these limits may be operable with suitable regulation of the rate of halogen introduction.

When a large excess of unreacted diolefin is present in the reaction mixture the introduction of halogen may be quite rapid; up to 1 mol of bromine per mol of diolefin per hour. This rate of halogen introduction should be decreased when the diolefin-halogen ratio decreases and must be quite slow when the value of this ratio approaches unity. Because of the danger of incomplete dispersion of bromine and resulting formation of tetrabromides from localized halogen excess we prefer to control the rate of addition of bromine in the range from 0.1 mol to 0.5 mol of bromine per mol of diolefin per hour.

The total quantity of halogen added must also be controlled for best results. We have found that a considerable quantity of tetrahalide is formed when the full theoretical amount of halogen necessary to convert the diolefin completely to dihalide is added. The addition of halogen should be discontinued when somewhat less than this theoretical amount has been added.

Under these conditions the reaction is operable in the temperature range from −60 to +30° C. However we generally prefer to operate at between −30 and −10° C. because of the ease with which formation of tetrahalogenated products is avoided. Because of its convenience, we generally prefer to operate at substantially atmospheric pressures although pressures of from 0.1 to 10 atmospheres may be employed when desired. Since the 1,4-dihalogen products are often intensely lachrymatory, such reactions should be conducted in a manner such that operators are protected from the vented gases.

In one specific embodiment of our invention a conjugated diolefin such as butadiene is introduced into a suitable reaction vessel and a sufficient amount of methylcyclopentane is added thereto to completely dissolve the diolefin. To this mixture is added bromine in an amount and at a rate such that an excess of unreacted halogen is avoided. When a reaction is complete the reaction mixture is filtered to separate 1,4-dibromo-2-butene and the filtrate is passed to a distillation vessel where solvent and unreacted butadiene are removed. The vicinal product 1,2-dibromo-3-butene remains as an oil which may subsequently be purified by distillation.

Methylcyclopentane used as solvent in our reaction should be free from contaminating n-hexane which is isomeric therewith and which tends to favor the production of 1,4-dihalides rather than the preferred vicinal dihalogenated derivatives. Methylcyclopentane is quite stable and can be recycled to this reaction over extended periods.

The following examples are given to illustrate advantages gained in processes embodying our invention.

*Example I*

A series of flasks was evacuated, cooled to −20° C., and charged with 4 mols of butadiene. To these were added 125 cc. of n-pentane, n-hexane, and methylcyclopentane, respectively, to serve as solvent media for the reactions. Into each flask was introduced 1 mol of bromine, the addition being made at a rate such that an excess of free bromine was avoided and requiring approximately 2 hours. The temperature was held at about −20° C. throughout the bromination, the reactants being well agitated at all times. Solid 1,4-dibromo-2-butene was separated on a filter, washed with n-pentane, dried and weighed. Solvent and unreacted butadiene were removed by low pressure distillation and the residual oil weighed as 1,2-dibromo-3-butene. Results are tabulated below.

| Solvent | 1,2-dibromo-3-butene | 1,4-dibromo-2-butene |
|---|---|---|
| | Percent | Percent |
| n-pentane | 46.1 | 53.9 |
| n-hexane | 46.7 | 53.3 |
| Methylcyclopentane | 53.2 | 46.8 |

*Example II*

A series of experiments was carried out as in Example I using methylcyclopentane, chloroform, and acetic acid (99.5%) as solvents. Where chloroform was employed as solvent all products were soluble. Separation was effected by removal of the chloroform by low pressure distillation after which the residue was washed with n-petane and treated as before.

With acetic acid the reaction mixture was poured into water, and extracted with ether. The ethereal solution was washed free from acid and dried over solid calcium chloride after which the ether was removed under reduced pressure. The dibromides were separated and weighed as before. Results are shown below.

| Solvent | 1,2-dibromo-3-butene | 1,4-dibromo-2-butene |
|---|---|---|
| | Percent | Percent |
| Methylcyclopentane | 53.3 | 46.7 |
| Chloroform | 44.7 | 55.3 |
| Acetic Acid | 46.4 | 53.6 |

*Example III*

The experiment of Example I was repeated employing a large excess of butadiene (8 mols per mol of bromine). No solvent was added, the excess butadiene being employed instead. The products were removed in n-pentane as before. The product comprised 41 per cent 1,2-dibromo-3-butene and 59 per cent 1,4-dibromo-2-butene.

Having described our invention and explained its operation, we claim:

1. A process for the preparation of a vicinal dibromide as a major reaction product which comprises dissolving a conjugated diolefin having from 4 to 10 carbon atoms per molecule in methylcyclopentane, maintaining the resulting solution at a temperature in the range from −60 to +30° C. while introducing bromine thereto, controlling the rate of introduction of said bromine so that the mol ratio of unreacted diolefin to free bromine in said solution is maintained at not less than 1:1, and separating a vicinal dibromide from the reaction mixture.

2. A process for the preparation of a vicinal dibromide as a major reaction product which comprises dissolving a conjugated diolefin having from 4 to 10 carbon atoms per molecule in methylcyclopentane, maintaining the resulting solution at a temperature in the range from −30 to −10° C. while introducing bromine thereto, controlling the rate of introduction of said bromine so that the mole ratio of unreacted diolefin to free bromine in said solution is maintained at not less than 1:1, and separating a vicinal dibromide from the reaction mixture.

3. A process for the preparation of 1,2-dibromo-3-butene as a major reaction product which comprises dissolving 1,3-butadiene in 2 to 4 times its volume of methylcyclopentane, maintaining the resulting solution at a temperature in the range from −60 to +30° C. while introducing bromine thereto in a manner adapted to secure substantially homogeneous composition of the resulting mixture, controlling the rate of introduction of said bromine so that the mol ratio of unreacted butadiene to free bromine in said mixture is not less than 1:1, and separating a vicinal dibromide from said mixture.

4. A process for the preparation of 1,2-dibromo-3-butene as a major reaction product which comprises dissolving 1,3-butadiene in 2 to 4 times its volume of methylcyclopentane, maintaining the resulting solution at a temperature in the range from −30 to −10° C. while introducing bromine thereto in a manner adapted to secure substantially homogeneous composition of the resulting mixture, controlling the rate of introduction of said bromine so that the mol ratio of unreacted butadiene to free halogen in said mixture is not less than 1:1, and separating a vicinal dibromide from said mixture.

5. A process for increasing the proportion of vicinal dibromide formed in a bromination reaction wherein bromine is caused to add to a conjugated diolefin having from 4 to 10 carbon atoms per molecule which comprises dissolving said diolefin in methylcyclopentane, maintaining the resulting solution at a temperature in the range from $-60°$ to $+30°$ C. while introducing said bromine thereinto in a manner adapted to secure substantially homogeneous distribution of said bromine throughout said solution, and controlling the rate of introduction of said bromine so that the mol ratio of unreacted diolefin to free bromine is maintained at not less than 1:1.

6. The process of claim 5 wherein the temperature of the solution is maintained in the range from $-30$ to $-10°$ C.

7. A process for the preparation of 1,2-dibromo-3-butene as a major reaction product, which comprises dissolving 1,3-butadiene in 2 to 4 times its volume of methylcyclopentane, maintaining the resulting solution at a temperature of about $-20°$ C. while introducing bromine thereto in a manner adapted to secure homogeneous composition of the resulting mixture, controlling the rate of introduction of said bromine so that the mol ratio of the unreacted butadiene to the bromine in said mixture is in excess of 1:1, and separating 1,2-dibromo-3-butene from said mixture.

JOHN C. HILLYER.
CLARK H. ICE.

REFERENCES CITED

The following references are of record in the file of this patent:

UNITED STATES PATENTS

| Number | Name | Date |
| --- | --- | --- |
| 2,242,084 | Nicodemus | May 13, 1941 |

OTHER REFERENCES

Muscat et al., J. A. C. S. 52, 1043–55.
Farmer et al., J. C. S. 131, 729.